United States Patent [19]

Eckle

[11] Patent Number: 4,719,690
[45] Date of Patent: * Jan. 19, 1988

[54] TOOL-CHANGING DEVICE FOR A MACHINE TOOL

[75] Inventor: Otto Eckle, Loechgau, Fed. Rep. of Germany

[73] Assignee: Komet Stahlhalter-und Werkzeugfabrik Robert Breuning GmbH, Besigheim, Fed. Rep. of Germany

[*] Notice: The portion of the term of this patent subsequent to Apr. 15, 2003 has been disclaimed.

[21] Appl. No.: 875,859

[22] Filed: Jun. 18, 1986

[30] Foreign Application Priority Data

Jul. 9, 1985 [DE] Fed. Rep. of Germany ... 8519793[U]

[51] Int. Cl.⁴ .......................................... B23Q 3/157
[52] U.S. Cl. ..................................... 29/568; 279/175
[58] Field of Search ................. 29/568, 264; 279/175; 414/729, 736, 744 A; 409/232, 234

[56] References Cited

U.S. PATENT DOCUMENTS

| 4,019,245 | 4/1977 | Stoilor et al. | 29/568 |
| 4,117,586 | 10/1978 | Uchida et al. | 29/568 |
| 4,509,235 | 4/1985 | Sakamoto | 29/568 X |
| 4,581,811 | 4/1986 | Eckle | 29/568 |
| 4,609,326 | 9/1986 | Roesler | 29/568 |

FOREIGN PATENT DOCUMENTS 144944 11/1980 Japan ................................. 29/568

Primary Examiner—Gil Weidenfeld
Assistant Examiner—Glenn Webb
Attorney, Agent, or Firm—Flynn, Thiel, Boutell & Tanis

[57] ABSTRACT

The tool-changing device has a changing head (7). By means of this, tool holders (4) with cylindrical parts (5) of different diameters can be inserted into a tool holder receiver (1). The changing head (7) has, at the end thereof which faces towards the tool holder (4) concerned at any moment, a substantially segmental part (7a) and a first centering recess provided in the latter, which first centering recess is formed by a part-cylindrical centering surface (8) having a radius corresponding approximately to the radius (R1) of the cylindrical part (5) of a first tool holder (4). Portions of a second part-cylindrical centering surface (9) are provided on the two opposite sides respectively of the segmental part (7a) on a part (7b) of the changing head (7) which is widened out in an axial direction with respect to the said segmental part, this second part-cylindrical centering surface (9) being concentric with the first centering surface (8) and its relatively long radius corresponding approximately to that of a cylindrical part of a second tool holder. The latter has near its radial screw-threaded bore a recess for the segmental part (7a). In the center of the first centering recess there is provided a connecting bolt which extends in the radial direction of movement of the changing head (7), is capable of being motor driven in either of two opposite directions of rotation at will and has an external screw-thread (10b) for engagement in the screw-threaded bore (6).

7 Claims, 6 Drawing Figures

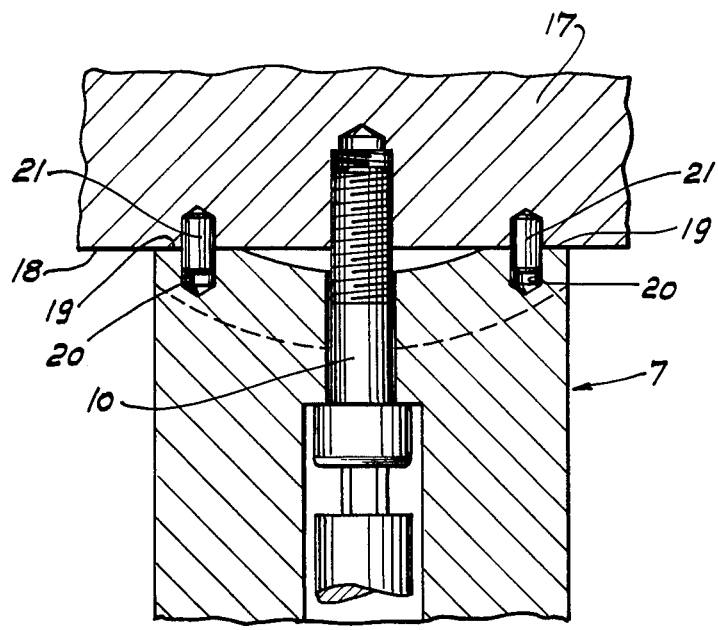

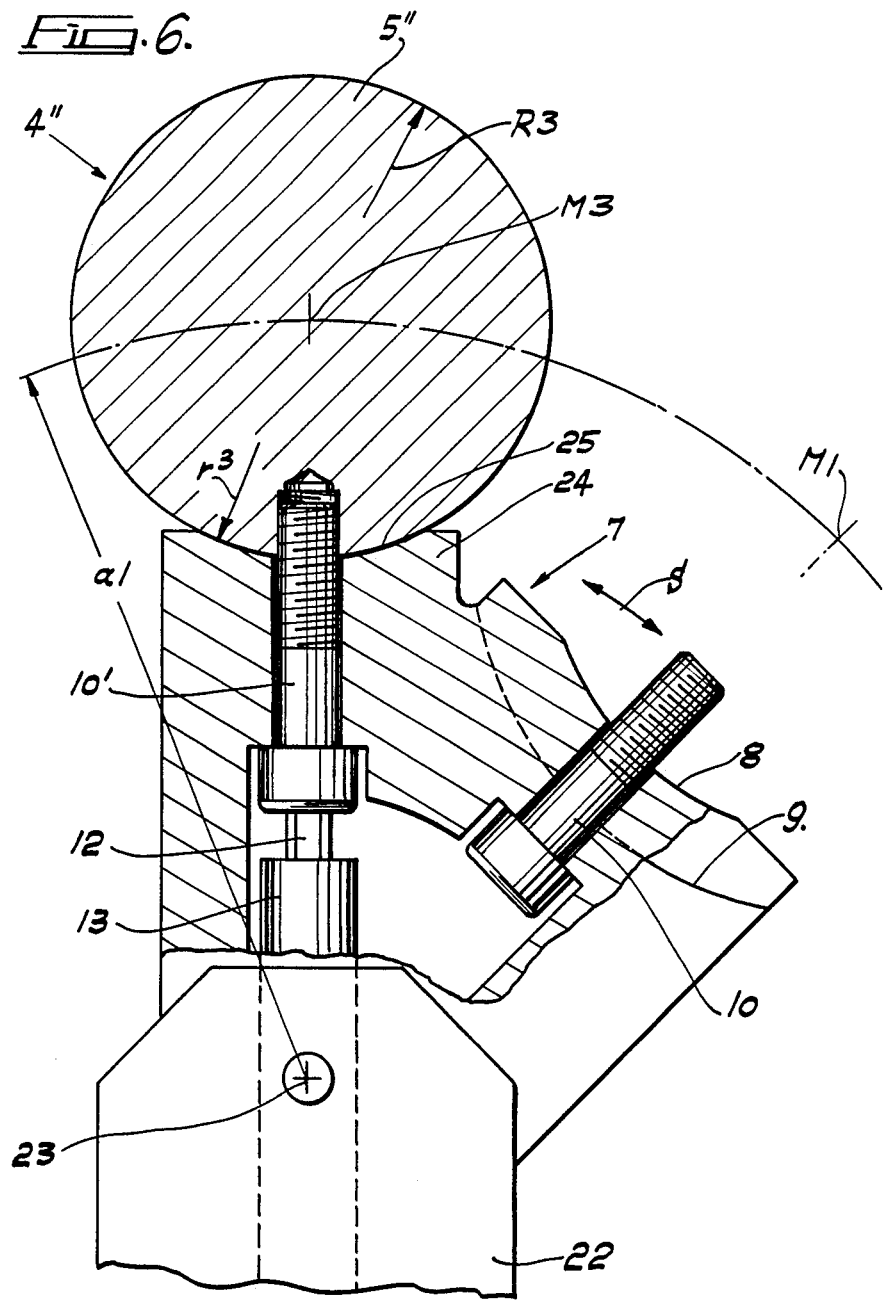

TOOL-CHANGING DEVICE FOR A MACHINE TOOL

FIELD OF THE INVENTION

The invention relates to a tool-changing device for a machine tool with a tool holder receiver, and more particularly a spindle provided on the machine tool, with a plurality of tool holders which can be inserted interchangeably in the tool holder receiver, each of the tool holders having a cylindrical part and a screw-threaded bore extending radially into the latter, and with a changing head mounted on the free end of a changing arm for movement radially with respect to the axis of the cylindrical part or of the spindle, the said changing head being provided, at the outer end thereof which faces toward the tool holder, with a centring (or centering) recess arranged to engage the cylindrical part of the latter during tool changing and being further provided in the centre (or center) of the centring recess with a connecting bolt extending in the radial direction of movement of the changing head and capable of being motor-driven in either of two opposite directions of rotation at will, the said connecting bolt being capable of restricted axial sliding movement in the changing head and having on its free end part an external screw thread which is engageable in the screw-threaded bore.

BACKGROUND OF THE INVENTION

A known changing device of this kind is described in EP-A 0 125 529. It is important inn such a changing device that the changing head, when in the changing position, is always spaced the same distance from the axis of the spindle, since only then is it ensured that the axis of the tool holder is in alignment with the axis of the spindle during tool changing. Since therefor the end position of the changing head with respect to the axis of the spindle in the known changing device is always the same, tool holders can be interchanged only if their cylindrical parts are of the same diameter. Usually, the cylindrical part is a portion of the shank of the tool holder which is supported by means of the said shank against the end surface of the spindle. Although it has been attempted to make the diameter of this shank as large as possible with a view to providing stability, it may be preferable, in the case of tools which are subjected to relatively small loads, such as reaming bits, small diameter drill bits, screw-thread cutting tools, etc., to make the shank smaller in diameter so that the tool holder is lighter and hence, because of its smaller size, is quicker to change and takes up less space in a magazine. A shank of smaller diameter inevitably has, however, the result that the cylindrical part of the tool holder in which the changing head is engageable will also be of smaller diameter. The known changing device is unsuitable for the interchangeable engagement of tool holders having cylindrical parts of different diameters.

The basic object of the invention is accordingly to provide a toolchanging device for a machine tool of the kind initially referred to which enables tool holders having cylindrical parts of different diameters to be interchanged, while the end position of the changing head with respect to the axis of the spindle remains constant.

This object is achieved according to the invention in that the changing head has, at the end thereof which faces towards the tool holder concerned at any time, a substantially segmented part and a first centring recess in the latter formed by a first part-cylindrical (arcuate) centring surface the radius of which corresponds approximately to the radius of the cylindrical part of a first tool holder, that portions of a second part-cylindrical (arcuate) centring surface are provided, one on each side of the segmental part, on a part of the changing head which is widened out axially of the latter, the said second centring surface being concentric with the first centring surface and having a radius corresponding approximately to the relatively large radius of a cylindrical part of a second tool holder which has, in the vicinity of its radial screw-threaded bore, a recess for the segmental part.

With this new tool-changing device, tool holders, which have cylindrical parts of different diameters, can be interchangeably received and replaced. If the tool holder has a cylindrical part of relatively small diameter, then the first centring surface engages this cylindrical part. If, however, another tool holder has a cylindrical part of relatively large diameter, then the changing head engages the cylindrical part by means of its second, larger radius centring surface. The recess in the cylindrical part is provided so that the segmental part, which in this case is superfluous and inoperative, can enter the said recess. The interchangeable tool holder is located in this case only with its cylindrical part in contact with the second centring surface parts of the changing head. Since these second centring surface parts are concentric with the first centring surface, the centring surfaces have a common centre of curvature or a common axis of curvature which, so long as the end position of the changing head with respect to the axis of the spindle remains unchanged, coincides with the latter.

BRIEF DESCRIPTION OF THE DRAWINGS

The invention is explained below in greater detail with reference to embodiments shown in the drawings, in which:

FIG. 5 is a partial cross-section during the reception of a part having a flat top surface, and FIG. 6 shows a second embodiment in front end view.

DETAILED DESCRIPTION

Figure 2:
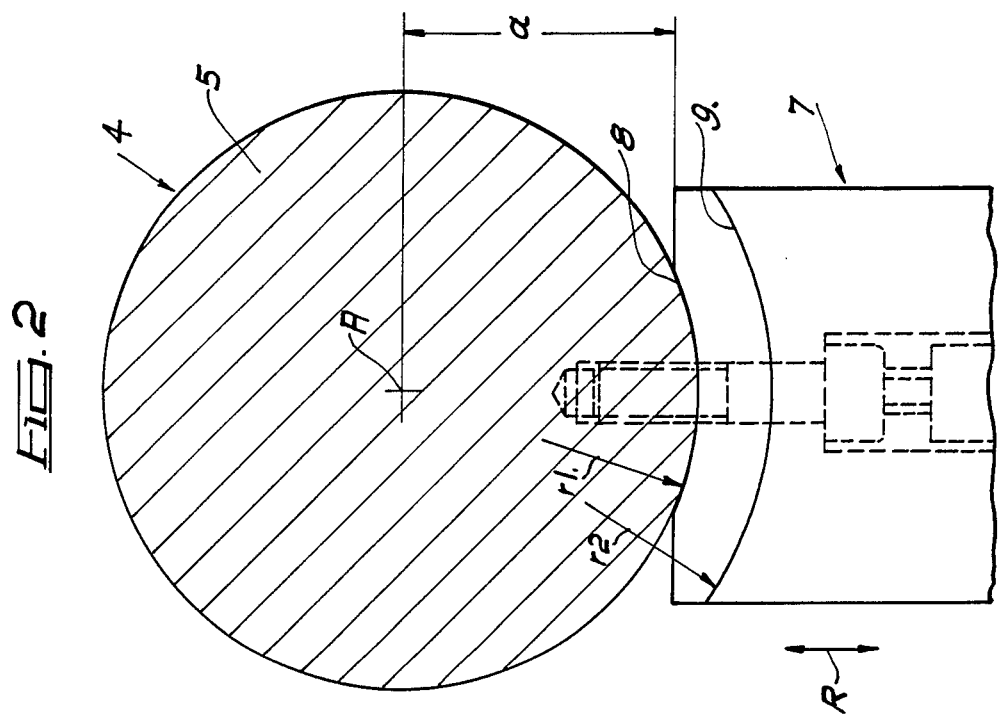
FIG. 2 is a partial cross-section taken on the line II—II in FIG. 1.
Figure 1:
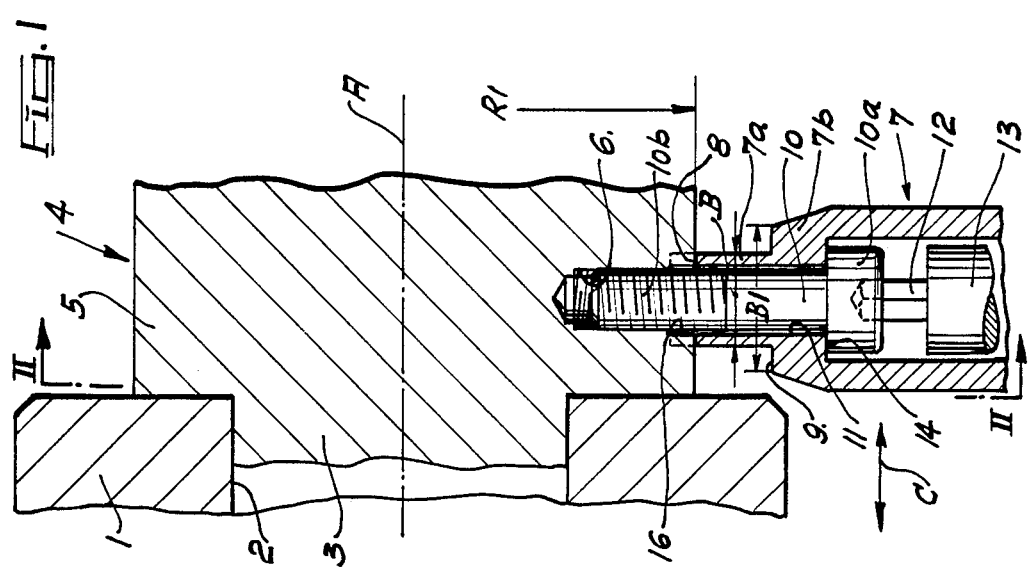
FIG. 1 is an axial section of a first embodiment during the reception of a tool holder of small diameter.

In FIGS. 1 and 2 of the drawings, the spindle of a machine tool, which is indicated at 1, has a cylindrical receiving bore 2 for the reception of a mating projection 3 of a first tool holder 4. The first tool holder 4 has a cylindrical part 5 with a radius R1 of, for example, 50 mm. A radially extending screw-threaded bore 6 is provided in the cylindrical part 4.

Figure 4:
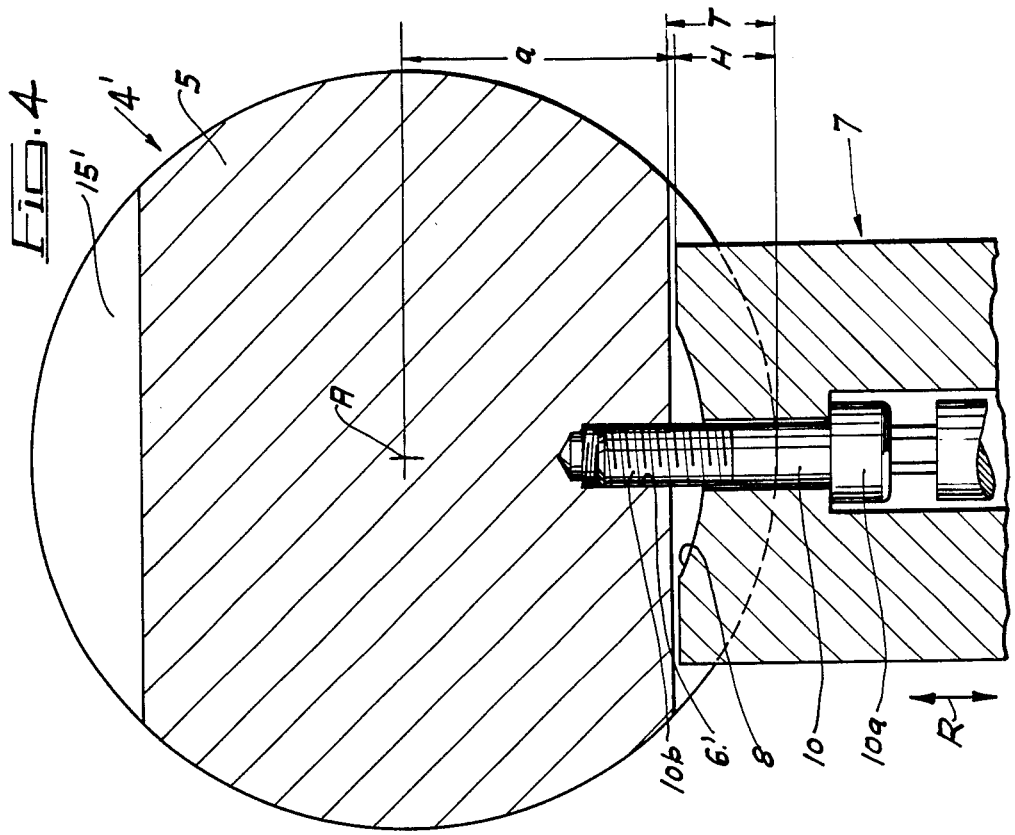
FIG. 4 is a cross-section taken on the line IV—IV in FIG. 3.
Figure 3:
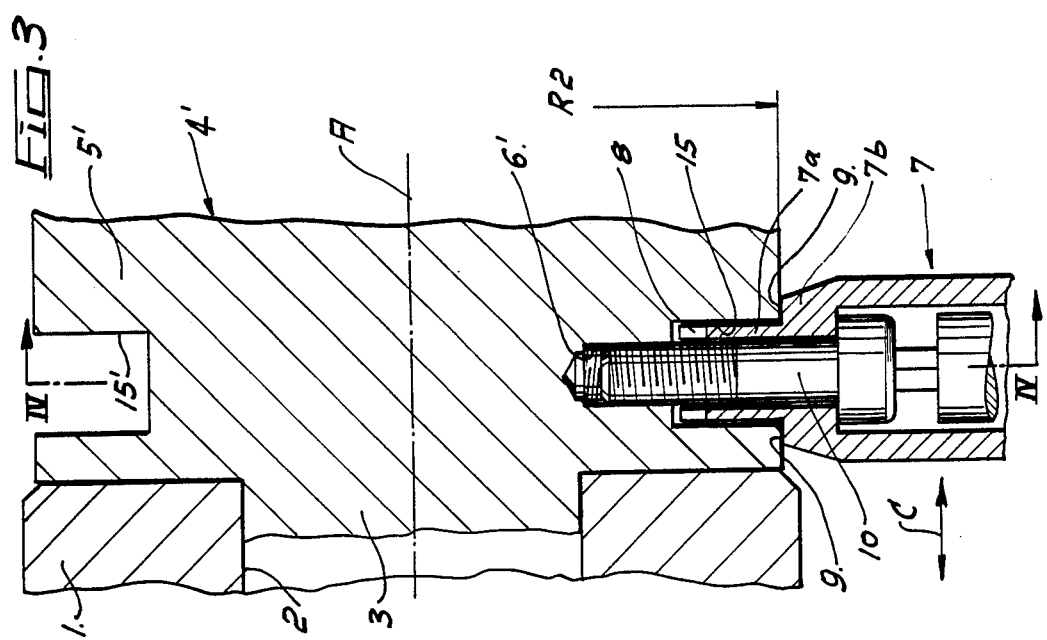
FIG. 3 is an axial section of the first embodiment during the reception of a tool holder of large diameter.

A second tool 4', which has a cylindrical part 5' with a larger radius R2 of, for example, 62.5 mm., will be inserted or interchanged, as shown in FIGS. 3 and 4, in the same spindle 1. A radial screw-threaded bore 6', the diameter of which corresponds to that of the screw-threaded bore 6, is provided in the cylindrical part 5'.

The mating projection 3 of the tool holder 4' is of the same dimensions as the mating projection 3 of the tool holder 4.

The changing head 7, is arranged on a changing arm (not shown) of the tool-changing device, which changing arm is movable in a radial direction R and also in an axial direction with respect of the axis A of the spindle. The arrangement is, however, such that the spindle head 7, when in the changing position is always, at the same distance a from the axis A of the spindle.

The changing head 7 is reduced stepwise as seen in axial section. It has at the end thereof which is directed towards the tool holder 4 or 4' a substantially segmental part 7a having a width B. A first centring recess is provided in this segmental part 7a. This centring recess is formed by a part-cylindrical (arcuate) centring surface 8. The radius r1 of this centring surface 8 is a few hundredth parts of a millimetre, e.g. about 0.02 mm, shorter than the radius R1 of the first tool holder 4.

Adjoining the segmental part 7a is a part 7b which is widened out in the axial direction of the tool holder 4 or of the spindle 1. This widened out part 7b has a width B1 which is greater than the width B. On this widened out part 7b there are provided, on each side of the segmental part 7a portions of a second part-cylindrical (arcuate) centring surface 9 by means of which a second centring recess is formed. The second centring surface 9 is concentric with the first centring surface 8 and has a radius r2 which is shorter by a few hundredths of a millimetre, e.g. 0.02 mm., than the radius R2 of the cylindrical part 5' of the second tool holder 4'. A connecting bolt 10 is slidably mounted in a radial bore 11 in the changing head 7. The head 12 of a screw-driver 13 which can be motor driven in either of two directions at will engages in teh socket in the head 10a of this connecting bolt. The bolt head 10a is supported on an annular shoulder 14 in the bore 11. At its leading end the connecting bolt 10 is provided with an external screw-thread bore 10b which engages in the radial screw-threaded bores 6,6'.

The tool holder 4' has, in the region of its screw-threaded bore 6', a segmental recess 15 into which the segmental part 7a of the changing head 7 can enter with play. It is thus ensured that the second centring surface 9 can engage the cylindrical part 5' of the tool holder 4', the maximum depth T of the recess 15 being somewhat greater than the maximum radial height H of the segmental part 7a.

Diametrically opposite the recess 15 there is preferably provided a further recess 15', the size of which corresponds, for the sake of mass equilibrium, with the size of the first recess 15. Since the recesses 15 and 15' are provided only at two diametrically opposite parts of the tool holder, the shank of the tool holer is not weakened over the remainder of its circumference.

The fact that the radii r1 and r2 of the centring surfaces 8 and 9 are in each case a few hundredths of a millimeter shorter than the radii R1 and R2 of the cylindrical parts, 5,5' of the corresponding tool holders 4,4', ensures that contact between the centring surface 8 and the cylindrical part 5 of the corresponding tool holder 4 takes place at those parts of the centring surface 8 which are located farthest apart circumferentially. Thus, the centring surface 8 has the effect of a prism and it is ensured that the axis of the tool holder 4 is coincident with the axis of the centring surface 8. The same holds good for the centring surface part 9 which, due to their radii r2 being shorter by a few hundredths of a millimeter than the radius R2 of the cylindrical part 5', has the same prism effect with respect to the tool holder 4'.

In order to change a tool, the changing head 7 is moved up in the direction R by means of the changing arm towards the tool holder located in the spindle 1 until the centring surface 8 engages the cylindrical part 5. Consequently, the connecting bolt 10 can first be withdrawn radially against the force of a spring (not shown). If the screwdriver 13 is then driven in a clockwise direction, the screw thread 10b of the connecting bolt will be screwed into the screw-threaded bore 6 until the bolt head 10a engages the annular shoulder 14. The tool holder 4 is thereby securely bolted to the changing head 7. By subsequent movement of the changing arm first in an axial direction C, the mating extension 3 of the tool holder 4 is withdrawn from the spindle 1. The changing arm, which in most cases is a two-armed lever, is next swung round through 180° and a changing head, which is provided on its second lever arm and carries another tool holder, is swung into position in front of the spindle 1. As a result of the movement of the changing arm in the axial direction C, the mating extension 3 of the next tool holder is then introduced into the receiving bore 2 in the spindle 1.

During the replacement of a tool holder 4' by one with a relatively large cylindrical part 5', the segmental part 7a first enters the recess 15 before the centring surface parts 9 come into engagement with the cylindrical surface 5'. At the same time the connecting bolt 10 is once more withdrawn radially and then, as described above, is screwed by means of its screw thread 10b into the screw-threaded bore 6' until the bolt head 10a becomes supported on the annular ledge 14 and the centring surface 9 is pressed firmly against the cylindrical part 5'.

In order that, in the case of a tool holder 4 having a cylindrical part 5 of relatively small diameter, the connecting bolt need not be rotated through so many turns in order to be screwed home into the screw-threaded bore 6, the said screw-threaded bore 6 is preferably provided with a non-screw-threaded counterbore 16.

Although the changing head 7 will be used primarily for the changing of tool holders 4,4' having cylindrical parts 5,5', it can also be used, as shown in FIG. 5 for engaging and changing a part 17 formed with a flat surface 18. For this purpose the changing head 7 has in flat parts 19 of its end surface on each side of the first centring surface 8 respective bores 20 which extend parallel to the axis of the connecting bolt 10. Centring pins 21 located in the flat surface 18, one on each side of the screw-threaded bore 6, fit in the bores 20. These centring pins 21 engage during the change over operation in the bores 20, so that the part 17 can be connected in a rotationally fixed and connectly aligned relationship with the changing head 7.

If tool holders having cylindrical parts of three different diameters are to be interchanged by means of one and the same changing device, then the changing head is preferably constructed and arranged in the manner shown in FIG. 6. In this embodiment, the changing head 7' is mounted on the changing arm 22 so as to be capable of pivotal movement about an axis 23 extending parallel to the axis A of the spindle. The pivotal movement may be imparted by a toothed rack or linkage (not shown). The right hand part of the changing head 7' shown in FIG. 6 corresponds in its construction and arrangement with the construction and arrangement of the changing head 7 of the embodiment shown in FIGS. 1 to 4, so that the same references are used for parts which operate in the same way and the above description is applicable mutatis mutandis.

A further changing head 24 formed integrally with the changing head 7' is angularly displaced, e.g. through 45°, in the direction S of swinging movement. This further changing head 24 has on its free end a centring surface 25, the radius r3 of which is shorter than the radius r1 of the first centring surface 8. The radius r3 is shorter by several hundredths of a millimetre than the radius R3 of the cylindrical part 5" of the further tool holder 4". The centre of curvature M3 of the centring surface 25 is spaced from the axis 23 of swinging movement by the same distance a1 as the centre of curvature M1 of the first centring surface 8. Furthermore, the centring surface 25 has associated with it a connecting bolt 10' of its own.

If a tool holder 4", the cylindrical part 5" of which has the short radius R3, is to be replaced, then the changing head 7' is swung round to the position shown in FIG. 6. In this case, when the changing head 7' is in its outer end position, the centre point M3 is then in alignment with the axis of the spindle and tool holders 4' having the radius R3 can be satisfactorily interchanged. If, however, tool holders 4 or 4' having the radius R1 or R2 are to be changed, then the changing head 7' is swung leftward out of the position thereof shown in FIG. 6 into the position shown in chaindotted lines.

The embodiments of the invention in which an exclusive property or privilege is claimed are defined as follows:

1. In a tool-changing device for a machine tool with a tool holder receiver, and more particularly a spindle, provided on the machine tool, with a plurality of tool holders which can be inserted interchangeably in the tool holder receiver, each of the tool holders having a cylindrical part and a screw-threaded bore extending radially into the latter and with a changing head mounted on the free end of a changing arm for movement radially with respect to the axis of the cylindrical part or of the spindle, the said changing head being provided, at the outer end thereof which faces towards the tool holder, with a centering recess arranged to engage the cylindrical part of the latter during tool changing and being further provided in the center of the centering recess with a connecting bolt extending in the radial direction of movement of the changing head and capable of being motor driven in either of two opposite directions of rotation at will, the said connecting bolt being capable of restricted axial sliding movement in the changing head and having on its free end part an external screw thread which is engageable in the screw-threaded bore, the improvement comprising wherein said changing head has at the end thereof which faces towards the tool holder concerned at any time, a substantially segmental part and a first centering recess in the latter formed by a first part-cylindrical (arcuate) centering surface the radius of which corresponds approximately to the radius of the cylindrical part of a first tool holder, wherein portions of a second part-cylindrical (arcuate) centering surface are provided, one on each side of the segmental part, on a part of the changing head which is widened out axially of the latter, the said second centering surface being concentric with the first centering surface and having a relatively large radius corresponding approximately to the relatively large radius of a cylindrical part of a second tool holder which has, in the vicinity of its radial screw-threaded bore a recess for the segmental part.

2. A device according to claim 1, wherein the recess is segmental and its maximum depth in a radial direction is somewhat greater than the maximum radial height of the segmental part.

3. A device according to claim 1, wherein the tool holder has at a position diametrically opposite the recess a second recess the size of which corresponds to that of the first recess so as to provide mass equilibrium.

4. A device according to claim 1, wherein the radii of the centering surfaces are in each case a few hundredths of a millimeter shorter than the radii of the part-cylindrical parts of the corresponding tool holders.

5. A device according to claim 4, wherein the radii of the centering surfaces are in each case about 0.02 mm shorter than the radii of the cylindrical parts.

6. A device according to claim 1, wherein for engagement with a part having a flat surface, each of two flat parts of the end surface of the changing head, which flat parts are located on the two opposite sides respectively of the first centering surface, is provided with a corresponding bore extending parallel to the axis of the connecting bolt and two locating pins mounted in the flat surface on the two opposite sides respectively of the screw-threaded bore are engageable as a close fit in the said bores in the flat parts.

7. A device according to claim 1, wherein the changing head on the changing arm is mounted for swinging movement about an axis which is parallel to the axis A of the spindle and that the changing head has a further part-cylindrical centering surface which is angularly displaced from the first centering surface in a direction of the swinging movement, the radius of the said further centering surface being shorter than the radius of the first centering surface, the center of curvature of the further centering surface being spaced from the axis of the swinging movement of the changing head by the same distance as the center of curvature of the first centering surface and the further centering surface having a separate connecting bolt associated therewith.

* * * * *